(12) United States Patent
Kaupert et al.

(10) Patent No.: US 8,637,203 B2
(45) Date of Patent: Jan. 28, 2014

(54) MODULAR FUEL CELL SYSTEM WITH BURNER-HEAT EXCHANGER MODULE

(75) Inventors: Andreas Kaupert, Esslingen (DE); Markus Münzner, Ebersbach (DE); Jörg vom Schloβ, Herzogenrath (DE)

(73) Assignee: Eberspaecher Climate Control Systems GmbH & Co. KG, Esslingen (DE)

( * ) Notice: Subject to any disclaimer, the term of this patent is extended or adjusted under 35 U.S.C. 154(b) by 481 days.

(21) Appl. No.: 12/634,013

(22) Filed: Dec. 9, 2009

(65) Prior Publication Data

US 2010/0143759 A1 Jun. 10, 2010

(30) Foreign Application Priority Data

Dec. 10, 2008 (DE) .......................... 10 2008 063 540

(51) Int. Cl.
*H01M 8/24* (2006.01)
(52) U.S. Cl.
USPC ............................ 429/459; 429/457; 429/458
(58) Field of Classification Search
USPC ......................................... 429/457, 458, 459
See application file for complete search history.

(56) References Cited

U.S. PATENT DOCUMENTS

| 6,372,372 | B1* | 4/2002 | D'Aleo et al. ................. 429/434 |
| 6,541,148 | B1 | 4/2003 | Walsh et al. |
| 6,627,339 | B2 | 9/2003 | Haltiner, Jr. |
| 7,279,246 | B2 | 10/2007 | Kelly et al. |
| 2001/0036568 | A1* | 11/2001 | Farkash et al. .................. 429/26 |
| 2004/0081874 | A1 | 4/2004 | Edlinger et al. |
| 2006/0008756 | A1* | 1/2006 | Kaupert et al. ............... 431/354 |
| 2006/0257709 | A1* | 11/2006 | Blum et al. ..................... 429/38 |
| 2007/0248868 | A1* | 10/2007 | Haltiner et al. ................. 429/38 |

FOREIGN PATENT DOCUMENTS

| DE | 101 53 372 A1 | 5/2002 |
| DE | 101 21 666 A1 | 11/2002 |
| DE | 103 10 642 A1 | 9/2004 |
| EP | 16 19 737 A1 | 1/2006 |

* cited by examiner

Primary Examiner — Zachary Best
(74) Attorney, Agent, or Firm — McGlew and Tuttle, P.C.

(57) ABSTRACT

A modular fuel cell system is provided, especially for use in vehicles, with a fuel cell module, which has a stack of a plurality fuel cell elements between a first end plate and a second end plate, with a burner-heat exchanger module, which has a heat exchanger for preheating cathode gas and a burner for reacting fuel cell waste gases. Manufacturing advantages are provided with the first end plate has, on a connection side facing away from the stack, an anode gas inlet opening, a cathode gas inlet opening, an anode waste gas outlet opening and a cathode waste gas outlet opening and if the burner-heat exchanger module has an anode gas outlet opening communicatingly connected to the an anode gas inlet opening, an cathode gas outlet opening communicatingly connected to the an cathode gas inlet opening, an anode waste gas inlet opening communicatingly connected to the an anode waste gas outlet opening and an cathode waste gas inlet opening communicatingly connected to the an cathode waste gas outlet opening.

20 Claims, 8 Drawing Sheets

MODULAR FUEL CELL SYSTEM WITH BURNER-HEAT EXCHANGER MODULE

CROSS REFERENCE TO RELATED APPLICATIONS

This application claims the benefit of priority under 35 U.S.C. §119 of German Patent Application DE 10 2008 063 540.5 filed Dec. 10, 2009, the entire contents of which are incorporated herein by reference.

FIELD OF THE INVENTION

The present invention pertains to a modular fuel cell system, especially for use in vehicles.

BACKGROUND OF THE INVENTION

Fuel cell systems may be carried along in motor vehicles as an additional source or the only source of electric energy. Such fuel cell systems are especially suitable for supplying electric users with energy independently from the operation of an internal combustion engine of the motor vehicle equipped with the fuel cell system.

To make it actually possible to use such fuel cell systems in motor vehicles, they need to have a design that is suitable for mass production.

SUMMARY OF THE INVENTION

The present invention pertains to the object of providing an improved or at least different embodiment of a fuel cell system, which embodiment is characterized especially by the possibility of simplified manufacture.

According to the invention a modular fuel cell system is provided, especially for use in vehicles. The system comprises a fuel cell module and a heat exchanger module. The fuel cell module comprises a stack of a plurality of fuel cell elements between a first end plate and a second end plate. The first end plate has an anode gas inlet opening, a cathode gas inlet opening, an anode waste gas outlet opening and a cathode waste gas outlet opening on a connection side facing away from the stack. The burner-heat exchanger module comprises a heat exchanger for preheating cathode gas and a burner for reacting fuel cell waste gases. The burner-heat exchanger module has an anode gas outlet opening communicatingly connected to the anode gas inlet opening, a cathode gas outlet opening communicatingly connected to the cathode gas inlet opening, an anode waste gas inlet opening communicatingly connected to the anode waste gas outlet opening, and a cathode waste gas inlet opening communicatingly connected to the cathode waste gas outlet opening.

The present invention is based on the general idea of designing the fuel cell system as a modular system, such that it comprises at least one burner-heat exchanger module and a fuel cell module. The two modules can be manufactured independently from one another within the framework of a preassembly. The preassembled modules can then be assembled in a simple manner within the framework of a final assembly. The idea of also arranging the educt ports necessary for supplying the fuel cell, namely, a cathode gas port and an anode gas port, at the burner-heat exchanger module, so that basically all essential ports are arranged at the burner-heat exchanger module, so that, in particular, no educt ports need to be provided at the fuel cell module, is especially advantageous in the modular system provided according to the invention. This is achieved by an end plate of a stack of a plurality of fuel cell elements having a connection side, which faces away from the stack and at which at least one anode inlet opening, at least one cathode gas inlet opening, at least one anode waste gas outlet opening and at least one cathode waste gas outlet opening are located. Thus, the complete educt supply takes place via the burner-heat exchanger module. This simplifies assembly, because the end plate provided with the connection side forms an interface that can be handled in a relatively simple manner for the educt flows.

Corresponding to an advantageous embodiment, openings, which are provided at the burner-heat exchanger module and are complementary to the openings on the connection side of said end plate at the fuel cell module, can be connected directly to the connection side of said end plate. An especially compact design is embodied by this mode of construction.

Corresponding to an alternative embodiment, the burner-heat exchanger module may have a connection plate, which has said complementary openings on a connection side facing away from the heat exchanger. This connection plate is present in addition to the end plates of the fuel cell and forms a separate component in this respect. This connection plate is connected to said end plate of the fuel cell module. The connection plate likewise defines hereby an interface, which is complementary to the interface of the fuel cell module, which said latter interface is formed with said end plate. Due to the use of such a connection plate, the educt paths between the two modules can be connected to one another in an especially simple manner. In addition, the use of the connection plate facilitates the subsequent removal of the fuel cell module, for example, for maintenance purposes, if the plates are fastened detachably to one another. As an alternative, they may also be connected nondetachably to one another.

It is obvious that the above-mentioned features, which will also be explained below, may be used not only in the particular combination indicated, but in other combinations or alone as well, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, corresponding to FIGS. 1 through 8, a fuel cell system 1 of modular design, which can be preferably used in a motor vehicle, comprises a fuel cell module 2 and a burner-heat exchanger module 3. Furthermore, a thermal insulation box may, e.g., also be provided, but this is not shown here. The two modules 2, 3 are arranged in this insulation box in the finished fuel cell system 1. Furthermore, the fuel cell system 1 may have a reformer, by means of which an anode gas containing hydrogen gas can be generated from hydrocarbons. The reformer is not shown here, either.

In addition, further peripheral devices may be present, for example, delivery means for driving and compressing different educts of the fuel cell system 1, as well as a control for operating the fuel cell system 1. These are likewise not shown here for simplification.

The fuel cell module 2 comprises two end plates, namely, a first end plate 4 and a second end plate 5. The first end plate 4 is located on a side of the fuel cell module 2 facing the burner-heat exchanger module 3, whereas the second end plate 5 is arranged on a side of the fuel cell module 2 facing away from the burner-heat exchanger module 3. The fuel cell module 2 has, moreover, a plurality of fuel cell elements 6, which are of a plate-shaped design and are stacked up one upon the other at right angles to the planes thereof. The fuel cell elements 6 thus form a stack 7 of individual fuel cell elements 6. The stack 7 is arranged between the end plates 4, 5. The fuel cell elements 6 each or the entire stack 7 have/has the same hole pattern as the first end plate 4. In the example being shown, the fuel cell module 2 comprises, moreover, a plurality of prestressing means 8, by means of which the two end plates 4, 5 can be prestressed against each other. Deformation of and hence damage to the fuel cell elements 6 during transportation or during the operation of the fuel cell system 1 can be prevented by this prestressing. As an alternative or in addition, the stack 7 may be prestressed during operation or in the built-in state via a carrying structure or a support frame in an insulation box. The prestressing means 8 can then be removed. The fuel cell proper of the fuel cell module 2 is formed by the unit comprising the stack 7 of fuel cell elements 6 and the two end plates 4, 5 and will hereinafter be called a fuel cell 9. The two end plates 4, 5 may preferably form a plus pole and a minus pole for tapping current from the fuel cell 9.

The burner-heat exchanger module 3 comprises a heat exchanger 10 and a burner 11. The heat exchanger 10 may also be called, in principle, a heat exchanger 10. The heat exchanger 10 is used to preheat or prewarm cathode gas, which is fed to the fuel cell 9 during the start-up and during the operation of the fuel cell system 1. Burner 11 is used to convert waste gases of the fuel cell 9. In particular, anode waste gas and cathode waste gas of the fuel cell 9 are burned in a combustion chamber 12 of the burner 11. Hot burner waste gases, which are removed through the heat exchanger 10, are formed in the process. The heat exchanger 10 is thus integrated in the cathode gas path, on the one hand, and in the burner waste gas path, on the other hand, and these gases flow through the heat exchanger 10 such that the media are separated from each other. The burner waste gas can now transfer heat to the cathode gas.

Figure 3:
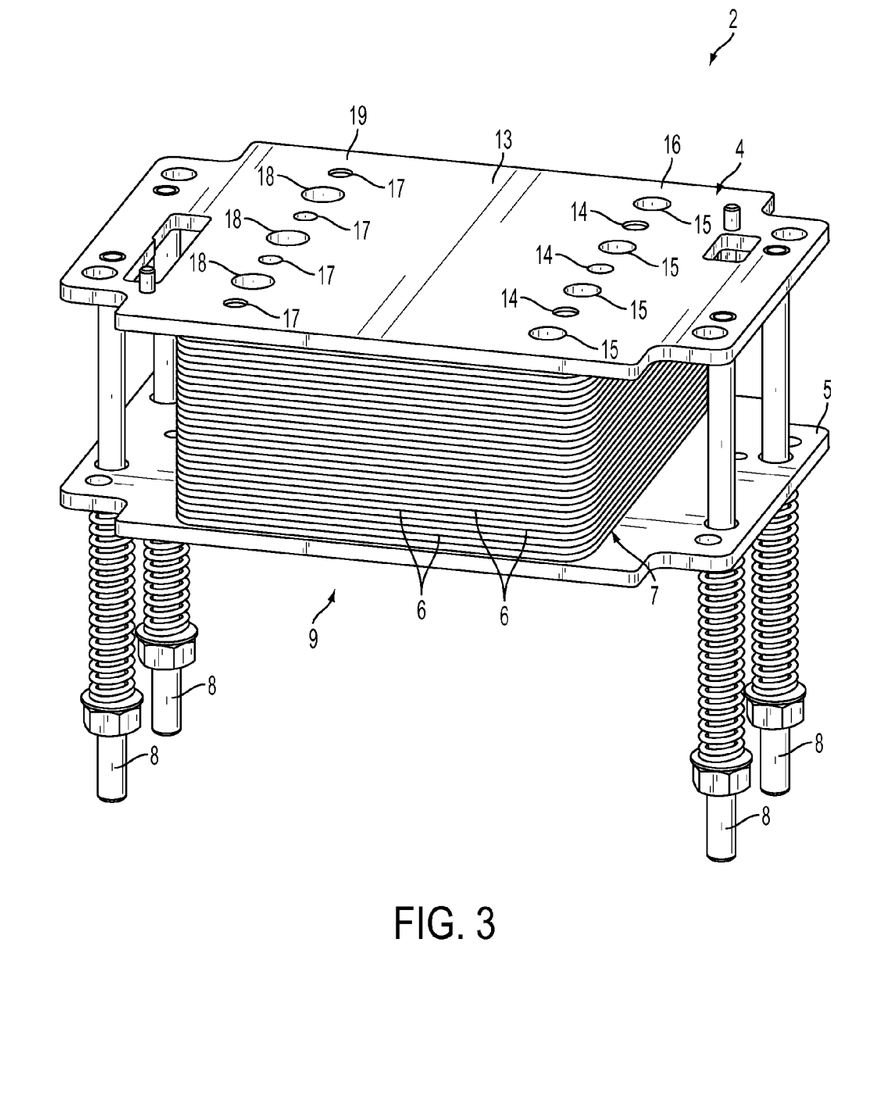
FIG. 3 is a schematic perspective view of a fuel cell module.
Figure 5:
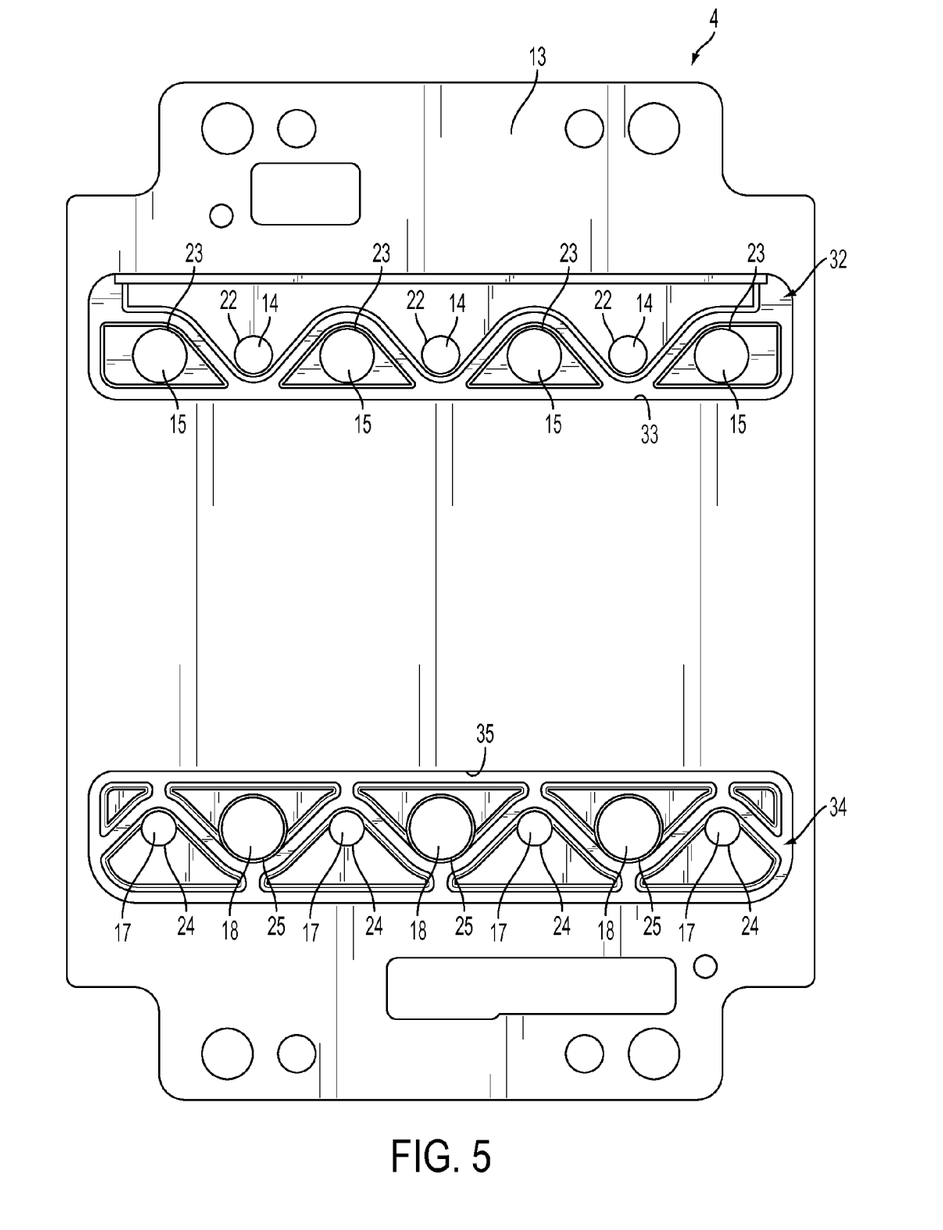
FIG. 5 is a schematic top view of a first end plate of the modular system in a first view direction.

Corresponding to FIGS. 3 and 5, the first end plate 4 has a connection side 13 facing away from the stack 7. At least one anode gas inlet opening 14 is formed on this connection side 13 at the first end plate 4. Three such anode gas inlet openings 14 are provided in the example without limitation of the general nature. Furthermore, the first end plate 4 has on the connection side 13 at least one cathode gas inlet opening 15. Four such cathode gas inlet openings 15 are provided in the example being shown without limitation of the general nature. The anode gas inlet openings 14 and the cathode gas inlet openings 15 are located along a straight line one after another in the example being shown, and the anode gas inlet openings 14 and the cathode gas inlet openings 15 alternate with one another. The inlet openings 14, 15 are located in a first edge area 16 of the first end plate or of the stack 7, which is located on the right in FIG. 3. As an alternative, said inlet openings 14, 15 may also be arranged offset in relation to one another, i.e., not in a straight line.

Furthermore, the first end plate 4 has at least one anode waste gas outlet opening 17 on the connection side 13. Four such anode waste gas outlet openings 17 are shown in the example without limitation of the general nature. In addition, at least one cathode waste gas outlet opening 18 is provided at the first end plate 4. Three such cathode waste gas outlet openings 18 are shown in the example without limitation of the general nature. Furthermore, the outlet openings 17, 18 are arranged in the example along a straight line alternating with one another. They are located in a second edge area 19 of the first end plate 4 or of the stack 7, which is shown on the left in FIG. 3. As an alternative, said outlets 17, 18 may also be arranged offset in relation to one another, i.e., not in a straight line.

Figure 1:
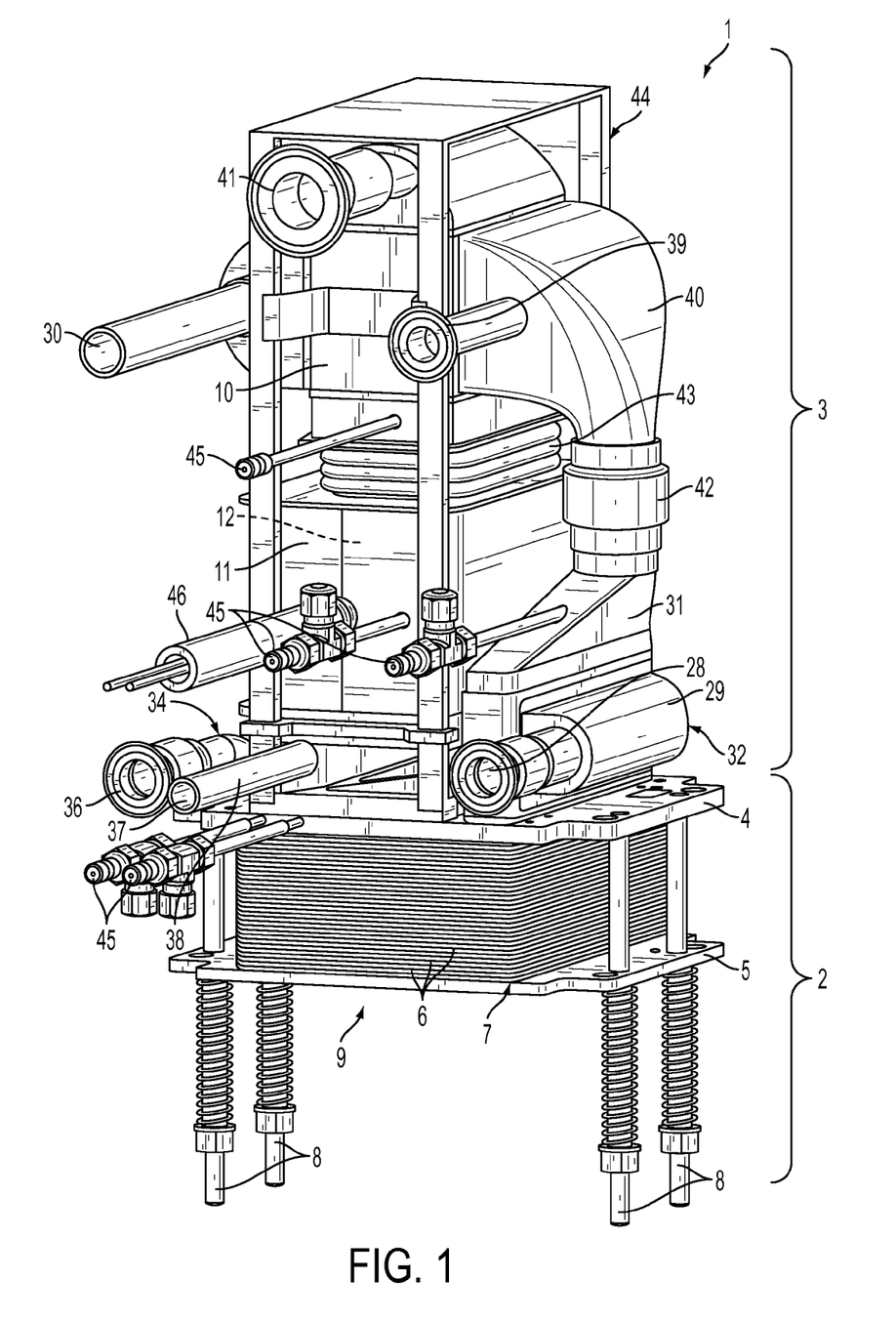
FIG. 1 is a schematic perspective view of a modular fuel cell system.
Figure 2:
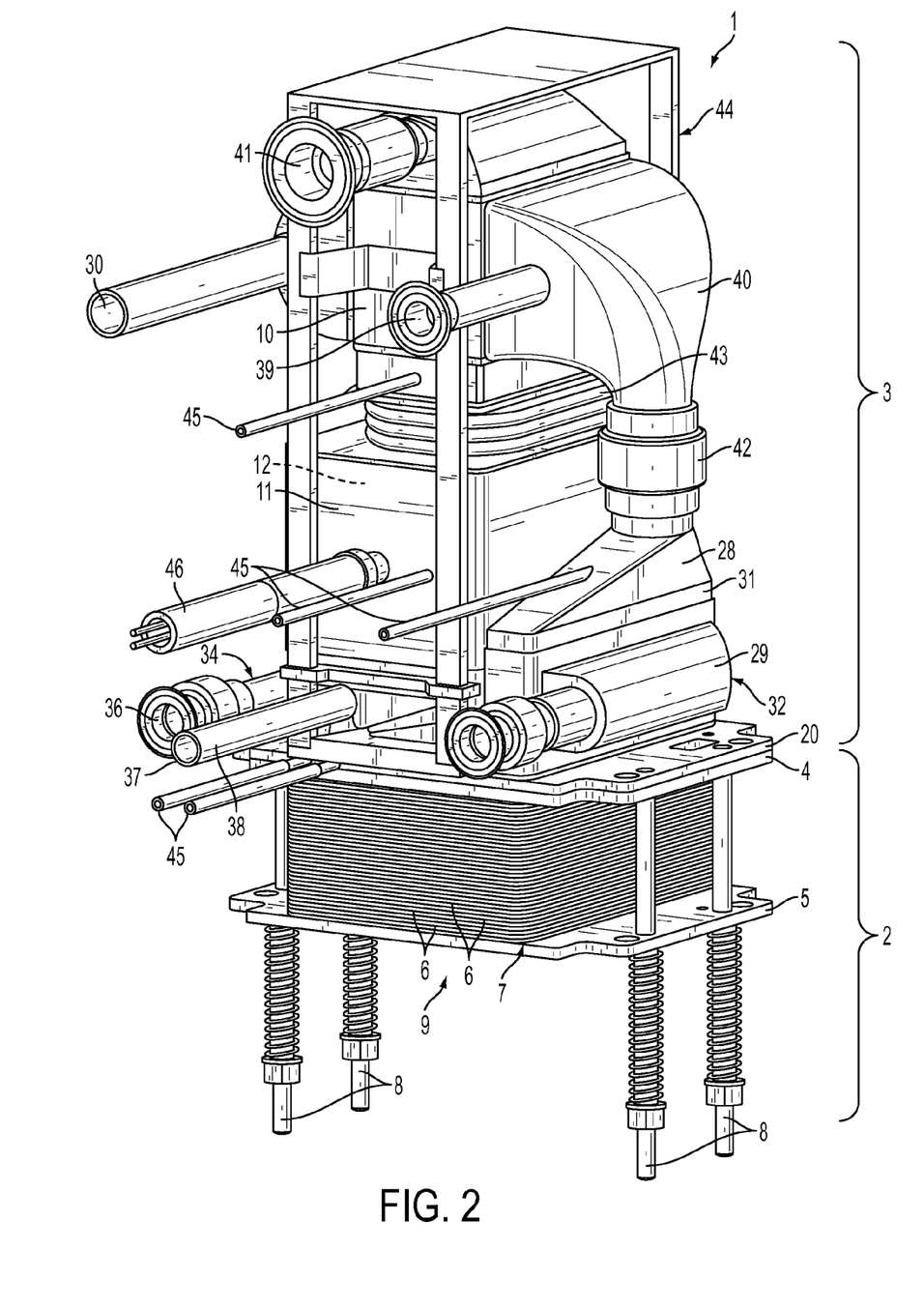
FIG. 2 is a schematic perspective view as in FIG. 1, but for another embodiment.
Figure 4:
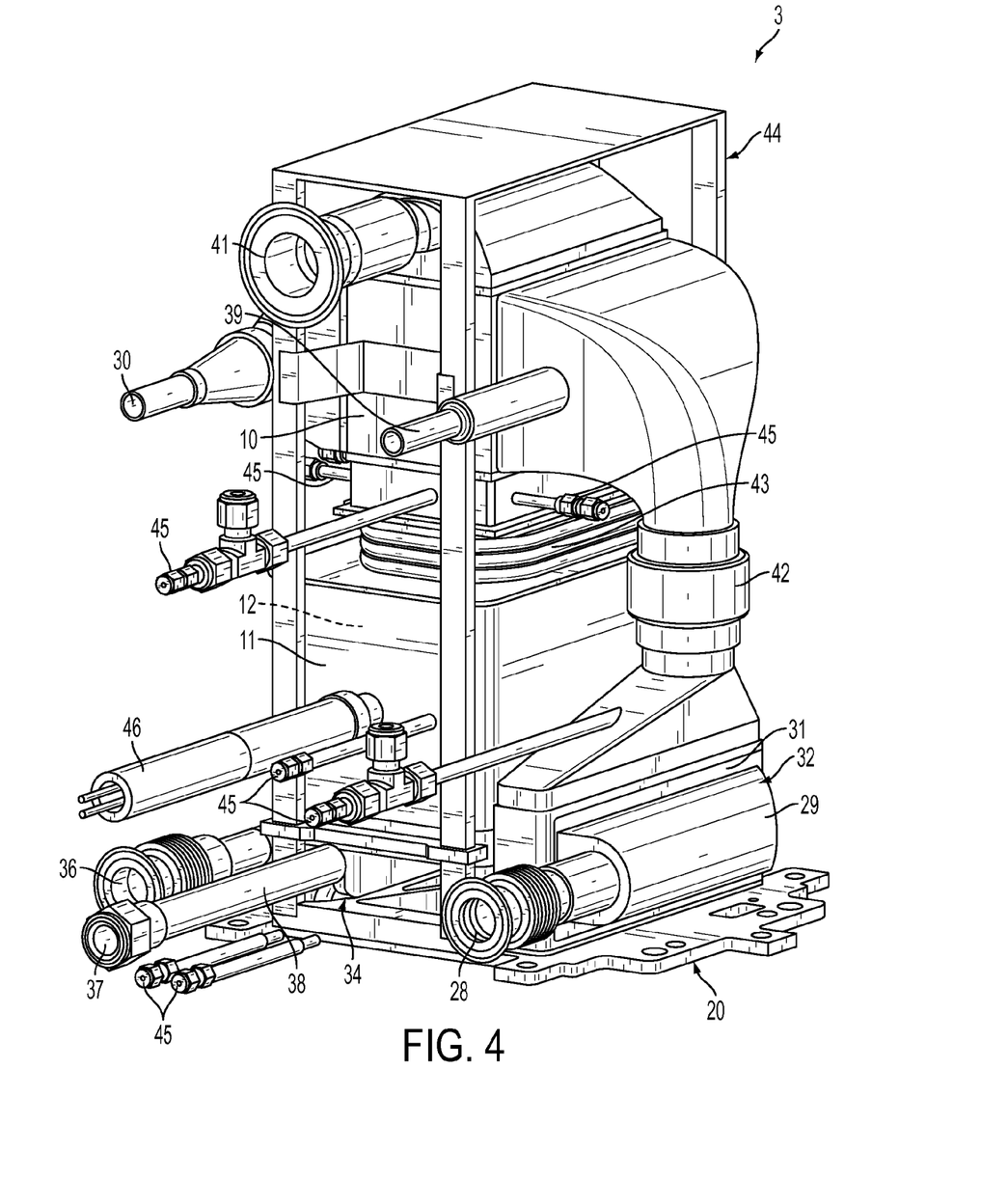
FIG. 4 is a perspective view of a burner-heat exchanger module.
Figure 6:
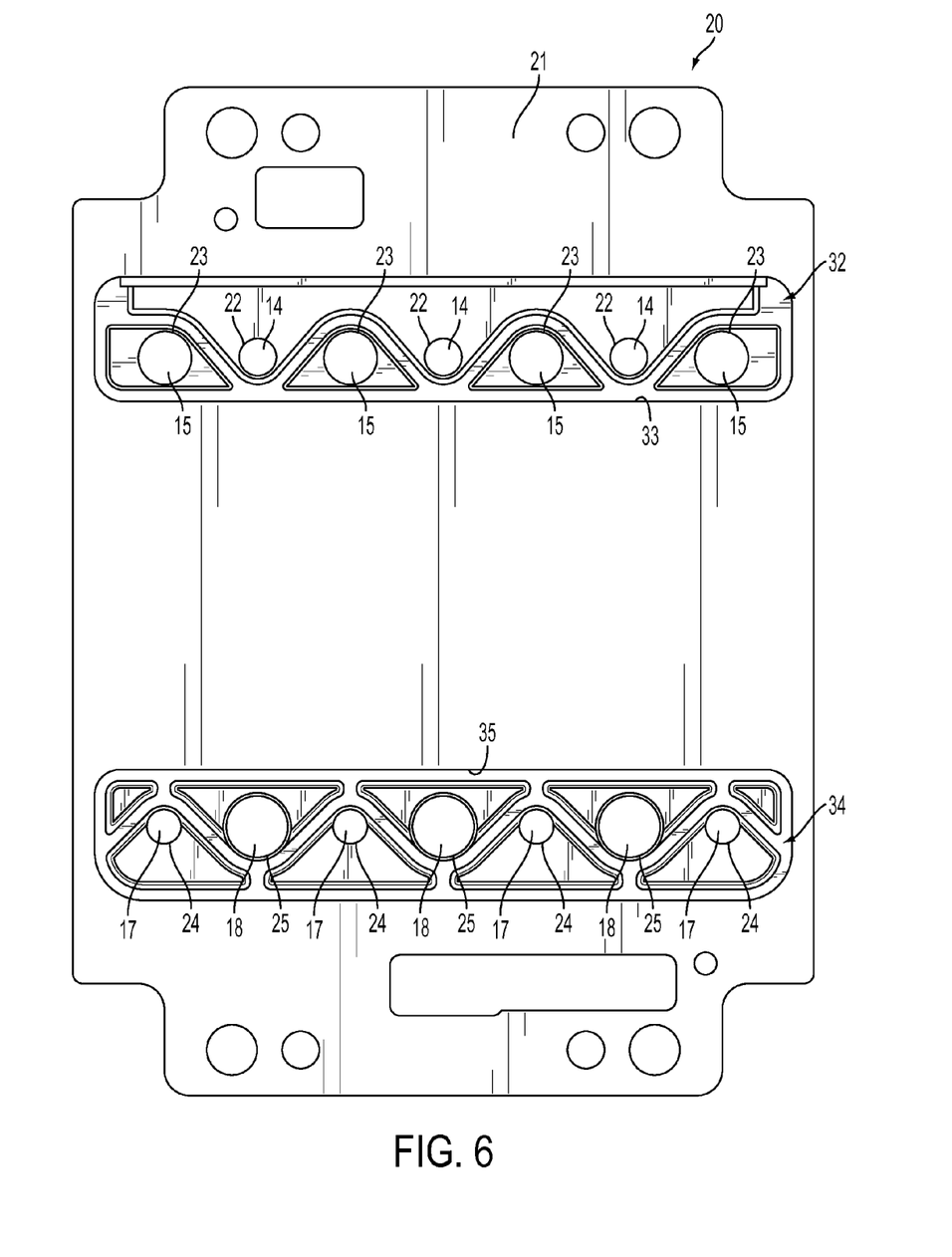
FIG. 6 is a schematic top view of a connection plate of the modular system in a first view direction.
Figure 7:
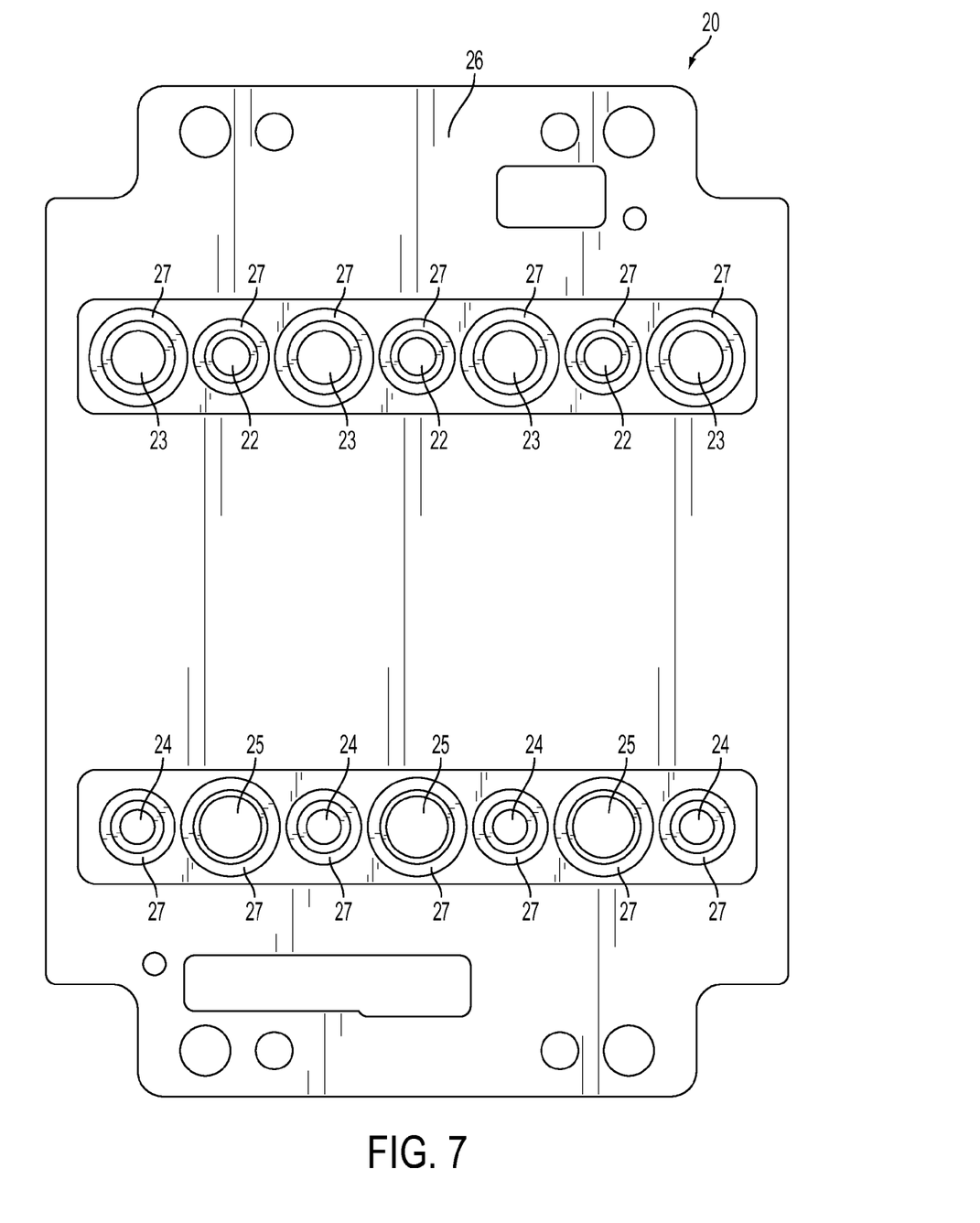
FIG. 7 is a schematic top view of the connection plate from FIG. 6, but in an opposite, second view direction.

Corresponding to FIGS. 2 and 4, the burner-heat exchanger module 3 may have a connection plate 20 on a side facing the fuel cell module 2. The fuel cell system 1 according to FIG. 1 may optionally also do without such a connection plate 20. FIG. 5 shows the connection side 13 of the first end plate 4, which said connection side faces away from the stack 7, in the variant according to FIG. 1. The two modules 2, 3 are connected in this case nondetachably to one another in the area of this first end plate 4 in the assembled state. Contrary to this, FIG. 6 shows a side 21 of the connection plate 20 facing the heat exchanger 10 or the burner 11 in the variant according to FIG. 2. The two modules 2, 3 can be connected detachably to one another in this case in the assembled state at the connection plate 20 and at the first end plate 4 or they may likewise be fastened nondetachably to one another. Thus, FIG. 5 shows the first end plate 4 with a view towards the connection side 13 for the embodiment shown in FIG. 1, which makes do without such a connection plate 20. FIG. 6 shows this connection plate 20 with view towards the side 21 facing the burner 11 or the heat exchanger 10 for the embodiment shown in FIGS. 2 and 4, which has such a connection plate 20.

In any case, the burner-heat exchanger module 3 corresponding to FIGS. 5 and 6 has, for each anode gas inlet opening 14 of the fuel cell module 2, an anode gas outlet opening 22 communicating therewith. Furthermore, the burner-heat exchanger module 3 has, for each cathode gas inlet opening 15 of the fuel cell module 2, a cathode gas outlet opening 23 communicating therewith. The burner-heat exchanger module 3 also has, for each cathode waste gas outlet opening 17 of the fuel cell module 2, an anode waste gas inlet opening 24 communicating therewith. For each cathode waste gas outlet opening 18 of the fuel cell module 2, a cathode waste gas inlet opening 25 communicating therewith is also provided at the burner-heat exchanger module 3. The openings 14-22, 15-23, 17-24, 18-25 belonging together are aligned with one another in the views in FIGS. 5 and 6.

Said openings 22, 23, 24, 25 of the burner-heat exchanger module 3 can be connected directly to the connection side 13 of the first end plate 4 in the embodiment shown in FIG. 1. Contrary hereto, said openings 22, 23, 24, 25 of the burner-heat exchanger module 3 are formed at the connection plate 20 in the embodiment shown in FIGS. 2 and 4, namely, on a connection side 26 shown in FIG. 7, which faces away from the heat exchanger 10 and from the burner 11 and thus faces the first end plate 4 of the fuel cell module 2. Connection plate 20 is fastened in the assembled state to the first end plate 4, and the connection side 26 of the connection plate 20 is in contact with the connection side 13 of the first end plate 4. As can be recognized, the first end plate 4 and the connection plate 20 have complementary opening patterns on the sides mutually facing each other, and, in particular, they may be congruent. Said openings 22, 23, 24, 25 of the burner-heat exchanger module 3, which are formed on the connection plate 20 in the embodiment according to FIGS. 2 and 4, may be sealed corresponding to FIG. 7 individually, i.e., each for itself, preferably by means of end seals 27. These end seals 27 are then arranged axially between the connection plate 20 and the first plate 4 in the mounted state. Corresponding to an advantageous embodiment, the end seals 27 are designed as metal ring seals. As an alternative, at least one collective seal, made, for example, of ceramic or metallic materials, which sealingly surrounds a plurality of openings 22, 23, 24, 25 at the same time, is also conceivable.

Corresponding to FIGS. 1, 2 and 4, the burner-heat exchanger module 3 has an anode gas inlet port 28. An anode gas source can be connected to the burner-heat exchanger module 3 via this anode gas inlet port 28. Such an anode gas source is, e.g., a reformer 47 (see FIG. 8) or a hydrogen tank. The anode gas inlet port 28 is communicatingly connected to the anode gas outlet openings 22 via an anode gas distributor 29 in the preferred example shown. Furthermore, the burner-heat exchanger module 3 is equipped with a cathode gas inlet port 30, via which a cathode gas source can be connected. For example, a delivery means 48 (see FIG. 8), e.g., a pump or a blower, with which a suitable cathode gas, e.g., air, is fed, is used as the cathode gas source. The cathode gas inlet port 30 leads over the heat exchanger 10 and over a cathode gas distributor 31 and to the cathode gas inlet openings 23. As can be recognized, the anode gas distributor 29 and the cathode gas distributor 31 are integrated in one another in the preferred embodiment being shown here, as a result of which they form a common fresh gas distributor box 32. This is communicatingly connected to the anode gas inlet port 28, on the one hand, and to the cathode gas inlet port 30, on the other hand Furthermore, it is designed internally such that it sends the arriving anode gas and the arriving cathode gas to the anode gas outlet openings 22 and to the cathode gas outlet openings 23 in such a way that the media are separated from each other. FIGS. 5 and 6 show at the top a section through this common fresh gas distributor box 32. As can be recognized, the cathode gas outlet openings 23 are separated therein from the anode gas outlet openings 22. The fresh gas distributor box 32 is connected to the first end plate 4 or to the connection plate 20, depending on the embodiment. To embody the most gas-tight connection possible here between the fresh gas distributor box 32 and the plate 4; 20 in question, plate 4; 20 in question may have a depression 33, which is complementary to the contour of the fresh gas distributor box 32 and into which the fresh gas distributor box 32 is inserted, on the side 13; 21 facing away from the stack 7 and facing the viewer in FIGS. 5 and 6. The anode gas outlet openings 22 and the cathode gas outlet openings 23 are arranged in this depression 33. In addition, the anode gas inlet openings 14 and the cathode gas inlet openings 15 are arranged within this depression 33 at the first end plate 4. The fresh gas distributor box 32 is preferably soldered or welded to plate 4; 20 in question in a gas-tight manner in the depression 33. It is likewise conceivable to make the fresh gas distributor box 32 at least partially integral with the plate 4; 20 in question, e.g., by embodying a correspondingly shaped casting.

A common anode gas distributor box 34, which can be recognized in FIGS. 1, 2 and 4, may be provided to draw off the waste gases of the fuel cell 9. The waste gas distributor box 34, which is shown in sectional views at the bottoms of FIGS. 5 and 6, connects for this purpose the anode waste gas inlet openings 24 and the cathode waste gas inlet openings 25 to a plurality of anode waste gas outlet openings, not shown here, and to a plurality of cathode waste gas outlet openings, not shown here, in such a way that the media are separated from each other. The anode waste gas outlet openings and the cathode waste gas outlet openings are communicatingly connected each per se to the combustion chamber 12. This means that the anode waste gas and the cathode waste gas are sent via the waste gas distributor box 34 to the combustion chamber 12 in such a way that the media are separated from each other. In the example shown in FIG. 1, the anode waste gas inlet openings 24 and the cathode waste gas inlet openings 25 are formed at this waste gas distributor box 34. In the embodiment shown in FIGS. 2 and 4, the waste gas distributor box 34 has openings, which are complementary to the anode waste gas inlet openings 24 of the connection plate 20 and to the cathode waste gas inlet openings 25 of the connection plate 20, and which are aligned with the corresponding openings of the connection plate 20 in the mounted state corresponding to FIG. 6 and are not designated separately in FIG. 6.

Corresponding to FIGS. 5 and 6, the waste gas distributor box 34 is connected to the first end plate 4 or to the connection plate 20, depending on the embodiment. The first end plate 4 or the connection plate 20 may have for this a depression 35 having a complementary shape to the contour of the waste gas distributor box 34 on a side 13; 21 facing away from the stack 7. The waste gas distributor box 34 is inserted into this depression 35 and is connected therein rigidly and gas-tightly to the respective plate 4; 20, e.g., by means of a soldered connection. The anode waste gas outlet openings 17 and the cathode waste gas inlet openings 24 as well as the cathode waste gas inlet openings 25 of the connection plate 20 are arranged in this depression 35.

Corresponding to FIGS. 1, 2 and 4, the burner-heat exchanger module 3 may be equipped, besides, with a recirculation port 36, via which anode waste gas can be returned, e.g., to the aforementioned reformer 47. The recirculation port 36 communicates for this with the anode waste gas inlet openings 24. The recirculation port 36 is preferably connected for this to the waste gas distributor box 34, namely, on the anode side or the anode waste gas side.

Furthermore, the burner-heat exchanger module 3 may be equipped with a cooling gas port 37, via which a suitable cooling gas, especially ambient air, can be fed to the combustion chamber 12. The cooling gas port 37 is preferably connected for this to the cathode waste gas inlet openings 25 in a communicating manner. It is advantageous here to connect the cooling gas port 37 to the waste gas distributor box 34 on the cathode side or the cathode waste gas side. Especially advantageous here is an embodiment in which a cathode waste gas chamber is formed in the waste gas distributor box 34, which said chamber communicates with all cathode waste gas inlets 25 and which communicates with all cathode waste gas outlet openings leading to the combustion chamber 12. A tubular body 38 of the cooling gas port 37, which has a plurality of radially arranged cooling gas outlet openings, which are associated with the individual cathode waste gas paths within the waste gas distributor box 34, protrudes into this cathode waste gas chamber. The cooling gas outlet openings may additionally have varying diameters in order to achieve uniform discharge of the cooling gas. The maximum waste gas temperature of the burner 11 is regulated by means of the cooling gas in order to protect the heat exchanger 10. The tubular body 38 may be dimensioned such that it completely fills said cathode waste gas chamber, so that separation of the cathode waste gas paths within the waste gas distributor box 34 is preserved with the tubular body 38 inserted. This tubular body 38 is closed especially on the end side and may also be called a cooling gas flute.

Corresponding to FIGS. 1, 2 and 4, the burner-heat exchanger module 3 additionally has a bypass port 39. This port 39 can likewise be connected to a cathode gas source, e.g., a delivery means 48. Cathode gas can thus likewise be fed via this bypass port 39, but the bypass port 39 is arranged downstream of the heat exchanger 10 relative to the direction of flow of the cathode gas, which is fed via the (main) cathode gas port 30, so that the cathode gas being fed via the bypass port 39 bypasses the heat exchanger 10. The bypass port 39 is connected to the fresh gas distributor box 32 in the example. The feeding of cathode gas via the bypass port 39 may be necessary for regulating the thermal balance of the fuel cell 9, e.g., in order to prevent overheating of the fuel cell 9 during the operation due to exothermal electrochemical reactions, i.e., during current generation.

The burner-heat exchanger module 3 has, besides, a burner waste gas outlet port 41, via which the burner waste gas can be drawn off after it has flown through the heat exchanger 10. Furthermore, compensators 42 and 43, of which one compensator 42 is arranged in the cathode gas path between the heat exchanger 10 and the fresh gas distributor box 32, here in the connection line 40, while the other compensator 43 is arranged in the burner waste gas path between the burner 11 and the heat exchanger 10, are provided in the example. The compensators 42, 43 make it possible to compensate different coefficients of thermal expansion and they make possible the compensation of different thermal expansions of different materials within the different paths and the components affected thereby during a cold start.

The burner-heat exchanger module 3 has a support frame 44, with which it is possible to transmit relatively strong compressive forces, e.g., through the insulation box, to the first end plate 4 or—depending on the mode of construction—to the connection plate 20, for example, in order to absorb external prestressing forces for prestressing the two end plates 4, 5 and in order to guide these forces around the heat exchanger 10 and around the burner 11.

The burner-heat exchanger module 3 has, in addition, a plurality of sensor ports 45, e.g., for temperature sensors, pressure sensors and lambda sensors, as well as a port 46 for an igniting member, which can be used in the combustion chamber 12 to ignite the anode gas-cathode gas mixture.

Figure 8:
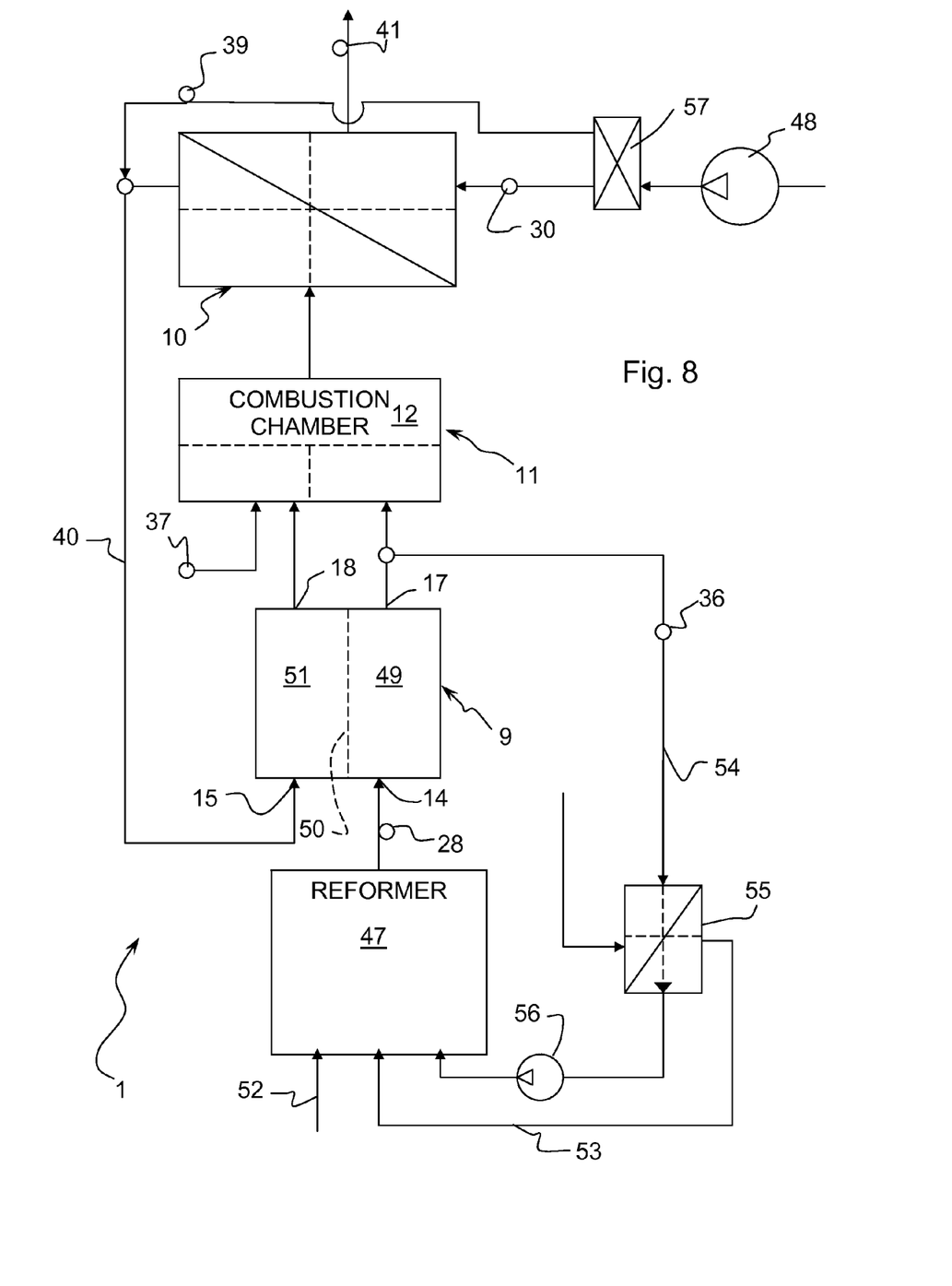
FIG. 8 is a greatly simplified, circuit diagram-like general view of the modular system.

FIG. 8 shows the individual educt paths in the fuel cell system 1 in a block diagram. A reformer 47, which is likewise present, generates reformate, which is fed as anode gas to the anode side 49 of the fuel cell 9. The respective anode side 49 in the fuel cell 9 or in the individual fuel cell elements 6 is separated from a cathode side 51 by an electrolyte 50. Reformer 47 receives on the inlet side a suitable fuel via a corresponding fuel feed line 52. Furthermore, a suitable oxidant is fed to the reformer 47 via an oxidant feed 53. Air is preferable as a suitable oxidant. Furthermore, recirculated anode waste gas is fed to the reformer 47 in the example. A corresponding recirculating line is designated by 54. It may contain a heat exchanger 55, by means of which the air fed to the reformer 47 can be preheated, on the other hand At the same time, the recycled anode waste gas may be cooled, on the other hand, to the extent that a delivery means 56 arranged in the recirculating line 54 downstream of the recirculating heat exchanger 55 will not be overheated. Reformer 47 is connected to the anode gas port 28. The recirculating line 54 is connected to the recirculation port 36.

The delivery means 48 for delivering cathode gas is connected via a valve means 57 to the cathode gas port 30, on the one hand, and to the bypass port 39, on the other hand. The valve means 57 can control the splitting of the cathode gas being delivered between the two ports 30, 39 as a function of the temperature loads of the fuel cell 9. The cathode gas flows from the cathode gas port 30 through the heat exchanger 10 and reaches the cathode side 51 of the fuel cell 9 via the connection line 40. The anode gas reaches the burner 11 or the combustion chamber 12 thereof from the fuel cell 9. The cathode waste gas likewise reaches the combustion chamber 12 from the fuel cell 9. As can be recognized, the media, namely, the anode waste gas and the cathode waste gas, are separated within the burner 11, e.g., via the waste gas distributor box 34 described farther above, up to the combustion chamber 12. A suitable cooling gas can be fed to the cathode waste gas path via the cooling gas port 37.

The burner waste gas passes through the burner 11 through the heat exchanger 10 to the burner waste gas port 41.

While specific embodiments of the invention have been described in detail to illustrate the application of the principles of the invention, it will be understood that the invention may be embodied otherwise without departing from such principles.

What is claimed is:

1. A modular fuel cell system comprising:
a fuel cell module comprising a stack of a plurality of fuel cell elements between a first end plate and a second end plate wherein the first end plate has an anode gas inlet opening, a cathode gas inlet opening, an anode waste gas outlet opening and a cathode waste gas outlet opening on a connection side facing away from the stack, said anode gas inlet opening and said cathode gas inlet opening being defined by a first connection side portion of said connection side, said anode waste gas outlet opening and said cathode waste gas outlet opening being defined by a second connection side portion of said connection side, said second connection side portion being located at a spaced location from said first connection side portion;
a burner-heat exchanger module comprising an anode gas distributor, a cathode gas distributor, a waste gas distributor, a heat exchanger for preheating cathode gas and a burner for reacting fuel cell waste gases, said waste gas distributor being arranged on one side of said burner, said anode gas distributor and said cathode opening distributor being arranged on another side of said burner, the burner-heat exchanger module having an anode gas outlet opening communicatingly connected to the anode gas inlet opening, a cathode gas outlet opening communicatingly connected to the cathode gas inlet opening, an anode waste gas inlet opening communicatingly connected to the anode waste gas outlet opening, and a cathode waste gas inlet opening communicatingly connected to the cathode waste gas outlet opening, and
said waste gas distributor box connects the anode waste gas inlet opening and the cathode waste gas inlet opening to the anode waste gas outlet opening communicating with a combustion chamber of the burner and to the cathode waste gas outlet opening communicating with the combustion chamber in such a way that the media are separated from one another.

2. A fuel cell system in accordance with claim 1, wherein the anode gas outlet opening, the cathode gas outlet opening, the anode waste gas inlet opening and the cathode waste gas inlet opening are connected directly to the connection side of the first end plate, said anode gas inlet opening being adjacent to said cathode gas inlet opening, said anode waste gas outlet opening being adjacent to said cathode waste gas outlet opening, each of said fuel cell elements being essentially perpendicular to said burner, each of said fuel cell elements having a fuel cell anode gas inlet and a fuel cell cathode gas inlet arranged on one side portion thereof, said one side portion being arranged on the another side of said burner, each of said fuel elements having a fuel cell cathode waste gas outlet and a fuel cell anode waste gas outlet arranged on another side portion thereof, said another side portion being arranged on said one side of said burner, said one side portion being opposite said another side portion, said fuel cell anode gas inlet being adjacent to said fuel cell cathode gas inlet, said fuel cell cathode waste gas outlet being adjacent to said anode waste gas outlet, said fuel cell anode gas inlet and said fuel cell cathode gas inlet being arranged on said another side of said burner, said fuel cell anode waste gas outlet and said fuel cell cathode waste outlet being arranged on said one side of said burner, said one side being substantially parallel to said another side.

3. A fuel cell system in accordance with claim 1, wherein the burner-heat exchanger module has a burner-heat exchanger module connection plate with the anode gas outlet opening, the cathode gas outlet opening, the anode waste gas inlet opening and the cathode waste gas inlet opening on a burner-heat exchanger module connection side of said burner-heat exchanger module connection plate facing away from the heat exchanger, said burner-heat exchanger module connection plate being substantially perpendicular to said burner, said burner-heat exchanger module engaging said first end plate, said end plate being substantially parallel to said burner-heat exchanger module connection plate, said first end plate being substantially perpendicular to said burner, said anode gas outlet opening being adjacent to said cathode gas outlet opening, said anode waste gas inlet opening being adjacent to said cathode waste gas inlet opening, said anode gas outlet opening and said cathode gas outlet opening being defined by a first portion of said burner-heat exchanger module connection side, said anode waste gas inlet opening and said cathode waste gas inlet opening being defined by a second portion of said burner-heat exchanger module connection side, said first portion of said burner-heat exchanger module connection side being located at a spaced location from said second portion of said burner-heat exchanger module.

4. A fuel cell system in accordance with claim 3, wherein:
the openings are sealed with end seals arranged between the connection plate and the first end plate; and
the end seals comprise at least one of ring seals, metal seals and ceramic seals.

5. A fuel cell system in accordance with claim 1, wherein the burner-heat exchanger module has additional anode gas outlet openings to provide a plurality of anode gas outlet openings, said first connection side portion defining additional anode gas inlet openings to provide a plurality of anode gas inlet openings, each of said anode gas inlet openings extending continuously in one direction from said connection side to another side of said first plate, each of said anode gas outlet openings being aligned with one of said anode gas inlet openings to define at least a portion of an anode gas flow path; and
the burner-heat exchanger module has an anode gas inlet port connected to an anode gas source, the anode gas inlet port being communicatingly connected to the plurality of anode gas outlet openings via said anode gas distributor.

6. A fuel cell system in accordance with claim 1, wherein:
the burner-heat exchanger module has additional cathode gas outlet openings to provide a plurality of cathode gas outlet openings, said first connection side portion defining additional cathode gas inlet openings to provide a plurality of cathode gas inlet openings, each of said cathode gas inlet openings extending continuously in one direction from said connection side to another side of said first plate, each of said cathode gas outlet openings being aligned with one of said cathode gas inlet openings to define at least a portion of a cathode gas flow path; and
the burner-heat exchanger module has a cathode gas inlet port connected to a cathode gas source, said cathode gas inlet port being substantially perpendicular to said heat exchanger, the cathode gas inlet port communicatingly connected to the plurality of cathode gas outlet openings via said cathode gas distributor, said cathode gas distributor receiving a flow of cathode gas, at least a portion of said flow of cathode gas being parallel to said burner and perpendicular to said heat exchanger, said fuel cell being arranged at a position below said heat exchanger and said burner, said flow of cathode gas being delivered in a downward direction toward said fuel cell module.

7. A fuel cell system in accordance with claim 1, wherein:
the burner-heat exchanger module has additional anode gas outlet openings to provide a plurality of anode gas outlet openings, said first connection side portion defining additional anode gas inlet openings to provide a plurality of anode gas inlet openings, each of said anode gas inlet openings extending continuously in one direction from said connection side to another side of said first plate, each of said anode gas outlet openings being aligned with one of said anode gas inlet openings to define at least a portion of an anode gas flow path;
the burner-heat exchanger module has an anode gas inlet port connected to an anode gas source, the anode gas inlet port being communicatingly connected to the plurality of anode gas outlet openings via said anode gas distributor;
the burner-heat exchanger module has additional cathode gas outlet openings to provide a plurality of cathode gas outlet openings, said first connection side portion defining additional cathode gas inlet openings to provide a plurality of cathode gas inlet openings, each of said cathode gas inlet openings extending continuously in said one direction from said connection side to said another side of said first plate, each of said cathode gas outlet openings being aligned with one of said cathode gas inlet openings to define to define at least a portion of a cathode gas flow path;
the burner-heat exchanger module has a cathode gas inlet port connected to a cathode gas source, the cathode gas inlet port communicatingly connected to the plurality of cathode gas outlet openings via said cathode gas distributor;
the anode gas distributor and the cathode gas distributor are integrated as a common fresh gas distributor box communicatingly connected to the anode gas inlet port and to the cathode gas inlet port, the common fresh gas distributor box sending arriving anode gas and arriving cathode gas to the anode gas outlet openings and to the cathode gas outlet openings such that the cathode gas and anode gas media are separated from one another.

8. A fuel cell system in accordance with claim 7, wherein the fresh gas distributor box is connected to one of the first end plate and the connection plate.

9. A fuel cell system in accordance with claim 8, wherein at least one of the first end plate and the connection plate, on the side facing away from the stack, has a depression, in which the anode gas inlet openings and the cathode gas inlet openings are arranged and into which the fresh gas distributor box is inserted and is connected to the respective plate in a gas-tight manner, said depression being closed on one side.

10. A fuel cell system in accordance with claim 7, wherein:
the burner-heat exchanger module has additional anode waste gas inlet openings to provide a plurality of anode waste gas inlet openings and additional cathode waste gas inlet openings to provide a plurality of cathode waste gas inlet openings; and
the first end plate has additional anode waste gas outlet openings to provide a plurality of anode waste gas outlet openings and additional cathode waste gas outlet openings a plurality of cathode waste gas outlet openings, said second connection side portion defining said plurality of anode waste gas outlet openings and said plurality of cathode waste gas outlet openings, each of said anode waste gas outlet openings extending continuously in one direction from said connection side to another side of said first plate, each of said anode waste gas outlet openings being aligned with one of said anode waste gas inlet openings to define at least a portion of an anode waste gas flow path, each of said cathode waste gas outlet openings extending continuously from said connection side to said another of said first plate, each of said cathode waste gas outlet openings being aligned with one of said cathode waste gas inlet openings to define at least a portion of a cathode waste gas flow path.

11. A fuel cell system in accordance with claim 10, wherein the waste gas distributor is connected to one of the first end plate and the connection plate.

12. A fuel cell system in accordance with claim 11, wherein at least one of the first end plate and the connection plate, on the side facing away from the stack, has a depression, in which the anode waste gas openings and the cathode waste gas openings are arranged and into which the waste gas distributor is inserted and is connected to the respective plate in a gas-tight manner, said depression being closed on one side.

13. A fuel cell system in accordance with claim 1, wherein the burner-heat exchanger module has a recirculation port communicatingly connected to the anode waste gas inlet opening, wherein the recirculation port is connected to said waste gas distributor on the anode side.

14. A fuel cell system in accordance with claim 1, wherein the burner-heat exchanger module has a cooling gas port communicatingly connected to the cathode waste gas inlet opening, wherein the cooling gas port is connected to said waste gas distributor on the cathode side.

15. A fuel cell system in accordance with claim 6, wherein the burner-heat exchanger module has a bypass port connected to a cathode gas source, the bypass port being communicatingly connected to the cathode gas outlet opening while bypassing the heat exchanger, said bypass port being arranged on one side of said heat exchanger, said heat exchanger being arranged between said bypass port and said cathode gas inlet port, said bypass port being substantially perpendicular to said heat exchanger.

16. A vehicle modular fuel cell system comprising:
a fuel cell module comprising a stack of a plurality of fuel cell elements between a first end plate and a second end plate, wherein the first end plate has anode gas inlet openings, cathode gas inlet openings, an anode waste gas outlet opening and a cathode waste gas outlet opening on a connection side facing away from the stack, said first end plate comprising a first end plate outer surface, said first end plate outer surface defining at least a portion of said anode gas inlet openings, at least a portion of said cathode gas inlet openings, at least a portion of said anode waste gas outlet opening and at least a portion of said cathode waste gas outlet opening;
a burner-heat exchanger module comprising a heat exchanger for preheating cathode gas and a burner for reacting fuel cell waste gases, said burner being substantially perpendicular to said first end plate outer surface, the burner-heat exchanger module having an anode gas inlet port connected to an anode gas source, a cathode gas inlet port connected to a cathode gas source, anode gas outlet openings communicatingly connected to the anode gas inlet openings, the anode gas inlet port being communicatingly connected to the plurality of anode gas outlet openings via an anode gas distributor, cathode gas outlet openings communicatingly connected to the cathode gas inlet openings, the cathode gas inlet port being communicatingly connected to the plurality of cathode gas outlet openings via a cathode gas distributor, an anode waste gas inlet opening communicatingly connected to the anode waste gas outlet opening, and a cathode waste gas inlet opening communicatingly connected to the cathode waste gas outlet opening, wherein a waste gas distributor is arranged on a first side of said burner, said cathode gas distributor and said anode gas distributor being located on a second side of said burner, said first side being opposite said second side; and
said waste gas distributor connects the anode waste gas inlet opening and the cathode waste gas inlet opening to the anode waste gas outlet opening communicating with a combustion chamber of the burner and to the cathode waste gas outlet opening communicating with the combustion chamber in such a way that the media are separated from one another, said cathode gas distributor being adjacent to said combustion chamber, said first side being substantially parallel to said second side.

17. A fuel cell system in accordance with claim 16, wherein:
said cathode gas distributor engages said anode gas distributor, the anode gas distributor and the cathode gas distributor being integrated as a common fresh gas distributor box communicatingly connected to the anode gas inlet port and to the cathode gas inlet port, the common fresh gas distributor box sending arriving anode gas and arriving cathode gas to the anode gas outlet openings and to the cathode gas outlet openings such that the cathode gas and anode gas media are separated from one another.

18. A fuel cell system in accordance with claim 17, wherein:
the burner-heat exchanger module has additional anode waste gas inlet openings to provide a plurality of anode waste gas inlet openings and additional cathode waste gas inlet openings to provide a plurality of cathode waste gas inlet openings; and
the first end plate has additional anode waste gas outlet openings to provide a plurality of anode waste gas outlet openings and additional cathode waste gas outlet openings to provide a plurality of cathode waste gas outlet openings, each of said anode gas inlet openings and each of said cathode gas inlet openings being defined by a first connection side portion of said connection side, each of said anode waste gas outlet openings and each of said cathode waste gas outlet openings being defined by a second connection side portion of said connection side, said second connection side portion being located at a spaced location from said first connection side portion, each of said anode waste gas outlet openings, said cathode waste gas outlet openings, said anode gas inlet openings and said cathode gas inlet openings extending continuously in one direction from said connection side to another side of said first plate, each of said anode waste gas outlet openings being aligned with one of said anode waste gas inlet openings to define at least a portion of an anode waste gas flow path, each of said cathode waste gas outlet openings being aligned with one of said cathode waste gas inlet openings to define at least a portion of a cathode waste gas flow path, each of anode gas inlet openings being aligned with one of said anode outlet gas openings to define at least a portion of an anode gas flow path, each of said cathode gas inlet openings being aligned with one of said cathode gas outlet openings.

19. A fuel cell system in accordance with claim 18, wherein the waste gas distributor is connected to one of the first end plate and a connection plate of said burner-heat exchange module, each of said fuel cell elements being substantially perpendicular to said burner, each of said fuel cell elements having a fuel cell anode gas inlet and a fuel cell cathode gas inlet arranged on one side portion thereof, each of said fuel cell elements having a fuel cell cathode waste gas outlet and a fuel cell anode waste gas outlet arranged on another side portion thereof, said one side portion being opposite said another side portion, said fuel cell anode gas inlet of each of said fuel cell elements being aligned with one of said anode gas inlet openings and one of said anode gas outlet openings, said fuel cell cathode gas inlet of each of said fuel cell elements being aligned with one of said cathode gas inlet openings and one of said cathode gas outlet openings, said fuel cell cathode waste gas outlet of each of said fuel cell elements being aligned with one of said cathode waste gas outlet openings and one of said cathode waste gas inlet openings, said fuel cell anode waste gas outlet of each of said fuel cell elements being aligned with one of said anode waste gas outlet openings and one of said anode waste gas inlet openings.

20. A fuel cell system in accordance with claim 18, wherein at least one of the first end plate and a connection plate of said burner-heat exchange module, on the side facing away from the stack, has a depression, in which the anode waste gas openings and the cathode waste gas openings are arranged and into which the waste gas distributor is inserted and is connected to the respective plate in a gas-tight manner, said depression being closed on one side.

* * * * *